UNITED STATES PATENT OFFICE.

SAMUEL PEACOCK, OF PHILADELPHIA, PENNSYLVANIA, ASSIGNOR, BY MESNE ASSIGNMENTS, TO AGRICULTURAL RESEARCH CORPORATION, OF NEW YORK, N. Y., A CORPORATION OF NEW YORK.

VOLATILE ALUMINUM COMPOUNDS AND PROCESS OF PRODUCING SAME.

1,154,801.  Specification of Letters Patent.  Patented Sept. 28, 1915.

No Drawing.   Application filed April 18, 1914.  Serial No. 832,809.

*To all whom it may concern:*

Be it known that I, SAMUEL PEACOCK, a citizen of the United States, residing at Philadelphia, in the county of Philadelphia and State of Pennsylvania, have invented certain new and useful Improvements in Volatile Aluminum Compounds and Processes of Producing Same; and I do hereby declare the following to be a full, clear, and exact description of the invention, such as will enable others skilled in the art to which it appertains to make and use the same.

This invention relates to a process of producing a volatile compound of carbon, nitrogen and aluminum from gaseous nitrogen, carbon and alumina.

My invention also relates to the new volatile product produced by this process, and has for its object the fixation of free nitrogen in a manner more efficient and less expensive than the methods heretofore proposed.

With these and other objects in view the invention consists in the new product and novel steps constituting my process more fully hereinafter disclosed and particularly pointed out in the claims.

In carrying out my process I prepare a charge of finely divided alumina and carbon, in suitable proportions, and preferably briquet the said charge. I then introduce the charge into a suitable furnace. Gaseous nitrogen, or producer gas is then introduced into the furnace chamber and an electric current is turned on, or other suitable heating means are employed to raise the temperature to say substantially 1550° C., whereupon I have reason to believe the following reaction takes place:—

$$Al_2O_3 + 6C + 3N_2 = Al_2N_2.C_3N_4 + 3CO$$

I have discovered that the carbo-nitrid thus formed in the high temperature zone of the furnace is in a volatile as well as in a solid form, and that the proportion of volatile to solid product depends in a measure upon the pressure existing in the furnace at the time of formation. In other words, I have discovered that when the furnace pressure is above that of the atmosphere the proportion of volatile to solid carbo-nitrid produced is less than is the case when the pressure is that of the atmosphere; and that when the pressure is less than that of the atmosphere the proportion of volatile product is greater than is the case when the atmosphere pressures exists in the furnace. For example, when the pressure in the furnace is maintained for 45 minutes at 1000 m.m. of mercury, about 70% of the carbo-nitrid formed is volatilized while the remainder is found as a solid in the charge; when the pressure is maintained at 760 m.m. for the same period substantially all the carbo-nitrid is volatilized; and when the pressure is less than that of the atmosphere all the carbo-nitrid is volatilized in a period of time less than 45 minutes.

Either nitrogen gas or producer gas may be employed as above stated, and when producer gas is employed such gas may contain on the average about 60% nitrogen, $N_2$ and 38% carbon monoxid, $CO$, so that when the nitrogen is removed by my process the producer gas is greatly improved and enriched by the carbon monoxid CO, generated by the reaction, and said producer gas can therefore later be utilized to greater advantage for combustion or other purposes. That is to say, from the carbo-nitrid equation, above, it is evident that for each volume of nitrogen fixed, an equal volume of carbon monoxid CO, is liberated, and joins the furnace gases. Now when producer gas is employed, having say 60% of nitrogen and 38% of carbon monoxid, and when one third or 20% of the nitrogen is fixed, it is evident that 20% of carbon monoxid will still be added to the 38% of carbon monoxid already present. Accordingly the resulting mixture will contain 58% of carbon monoxid instead of its original 38%. It follows, therefore, that the producer gas by my process is not only purified of its nitrogen but it is also enriched by a substantial addition of carbon monoxid causing it to become a valuable by-product.

In carrying out the process in order to avoid a serious retardation of the reaction it is desirable to maintain such a flow of nitrogen through the furnace that the partial pressure of the carbon monoxid gas present will not exceed say 350 to 400 millimeters of mercury.

The volatile carbo-nitrid thus produced may be recovered by leading it from the furnace and allowing it to solidify or condense in suitable chambers, or by absorption in water or other solutions. If recovered by condensation, the solid thus obtained may be subjected to the action of water at substantially 200° C., when the following reaction takes place:—

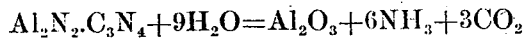
$$Al_2N_2.C_3N_4 + 9H_2O = Al_2O_3 + 6NH_3 + 3CO_2$$

If the carbo-nitrid is recovered by treatment with water, it hydrolizes forming alumina and a polymer of cyanamid having some of the properties of melamin, the combined nitrogen of which may be converted into ammonia by heating the solution to substantially 200° C. in a suitably closed vessel.

If the volatile product is allowed to condense as a loose powder when recovering it, it is apt to absorb any moisture with which it might come in contact and also to rapidly oxidize if exposed to free oxygen, and therefore care should be taken to prevent the exposure of this new product to water vapor or to the atmosphere.

In actual tests using alumina, carbon, nitrogen gas and a temperature of 1550° C. for 45 minutes, analyses show that over 70% of the aluminum present in the alumina carried by the charge appeared in the volatile carbo-nitrid produced. These analyses further show chemically combined nitrogen as well as chemically combined carbon in the volatilized products in the proportion required by the formula $Al_2N_2.C_3N_4$. It is therefore certain that my volatile product is a carbonitrid and not a nitrid.

The reactions of my new volatile product when hydrolized leads to the supposition that it produces a polymer of cyanamid in that it gives some of the characteristic reactions of melamin, such as a white precipitate with soluble silver and lead salts.

It is obvious that those skilled in the art may vary the details of my process without departing from the spirit of my invention, and therefore I do not wish to be limited to the above disclosure except as may be required by the claims.

What I claim is:—

1. The process of producing a volatile aluminum carbo-nitrid, which consists in preparing a mixture of alumina carbon; and subjecting said mixture in an atmosphere containing free nitrogen to a temperature sufficient to produce said volatile carbo-nitrid, and collecting said volative product substantially as described.

2. The process of producing a volatile aluminum carbo-nitrid which consists in preparing a mixture of alumina and carbon; subjecting said mixture in an atmosphere containing nitrogen to a temperature sufficient to produce said carbo-nitrid, and recovering the latter in a medium devoid of chemically active oxygen, substantially as described.

3. The process of producing a volatile aluminum carbo-nitrid which consists in preparing a mixture of alumina and carbon; subjecting said mixture in an atmosphere of producer gas to a temperature sufficient to produce said carbo-nitrid, and recovering the latter in a medium devoid of chemically active oxygen, substantially as described.

4. The process of producing a volatile aluminum carbo-nitrid, which consists in preparing a mixture of alumina carbon; and subjecting the same in an atmosphere containing free nitrogen to a temperature sufficient to produce said carbo-nitrid thereby causing carbon-monoxid to be evolved while maintaining the partial pressure of the carbon-monoxid present below 400 millimeters of mercury, and collecting said volatile carbo-nitrid substantially as described.

5. The herein described new product containing chemically combined carbon, nitrogen and aluminum the same being volatile at 1550° C., capable of forming a white powder and its hydrolytic product capable of producing a white precipitate with soluble silver and lead salts, as well as producing ammonia when subjected to the action of water at 200° C., substantially as described.

6. The process of simultaneously fixing nitrogen and enriching producer gas which consists in preparing a mixture of carbon and aluminum oxid; feeding producer gas containing nitrogen to said mixture; and raising the temperature of said mixture sufficiently to cause some of said nitrogen to be withdrawn from said gas and chemically fixed and to add additional quantities of carbon monoxid in said producer gas, substantially as described.

In testimony whereof I affix my signature, in presence of two witnesses.

SAMUEL PEACOCK.

Witnesses:
T. A. WITHERSPOON,
FRANCES SIEBEL.